Dec. 24, 1968  G. JÖCKEL  3,418,555

VOLTAGE MULTIPLYING RECTIFIER CIRCUIT

Filed May 18, 1967

Inventor:
Günther Jöckel
By: Spencer & Kaye
Attorneys

United States Patent Office 3,418,555
Patented Dec. 24, 1968

3,418,555
VOLTAGE MULTIPLYING RECTIFIER CIRCUIT
Günther Jöckel, Wedel, Holstein, Germany, assignor to Licentia Patent-Verwaltungs G.m.b.H., Frankfurt am Main, Germany
Filed May 18, 1967, Ser. No. 639,557
2 Claims. (Cl. 321—15)

ABSTRACT OF THE DISCLOSURE

A plurality of rectifier stages are coupled together in series to form a combined D.C. output voltage which is equal to the sum of the voltages of the individual rectifier stages. Each of the rectifier stages contains an input capacitor, an output capacitor, and a rectifier circuit connected between the input and output capacitors for rectifying an A.C. voltage applied to the input capacitor and applying the rectified voltage to the output capacitor. The output capacitors are connected together in series, and a capacitance voltage divider is connected to the input of selected ones of the rectifier stages for varying the A.C. voltage applied thereto. The input capacitors of the other rectifier stages are connected in parallel with the capacitance voltage divider so that their A.C. input voltage is not affected by variations of the capacitance voltage divider.

Background of the invention

This invention relates to a voltage multiplying rectifier circuit in which the D.C. output voltages of a plurality of individual rectifier stages are connected together in series to produce a relatively high D.C. output voltage. Such circuits are conventionally used to produce high D.C. voltages for the anodes of image converter tubes and the like.

When supplying multiple-electrode tubes with an anode voltage produced in this manner, fractional voltages of the anode voltage are required which must be infinitely variable within a certain tolerance range and which additionally must be able to follow proportionately all changes in the anode voltage. For this purpose, circuit arrangements have been used in the past wherein a resistance voltage divider including a potentiometer is connected to the desired rectifier stage on the D.C. voltage side of such a series circuit, with the required fractional voltage being tapped off by means of the potentiometer.

This prior art circuit arrangement, however, has serious drawbacks, particularly in high impedance load circuits, such as, for example, image converter tubes. Due to the waste current flowing through the resistance voltage divider, an additional power loss is produced which considerably exceeds the power utilized in the high impedance load circuit. However, it is impossible to construct the resistance voltage divider with an equally high impedance because the required range for the fractional voltage necessitates a correspondingly large range in the potentiometer. Conventional potentiometers have an upper limit with respect to resistance, so that a multiple of the useful output always flows off via the voltage divider even with a high impedance potentiometer. Furthermore, the entire circuit is considerably unbalanced by branching off such a large amount of current at an intermediate point of the series circuit.

Summary of the invention

The object of this invention is to provide a voltage multiplying rectifier circuit wherein infinitely variable fractional voltages can be obtained in a simple manner without the above-noted disadvantages. In accordance with this invention, an additional capacitor is connected in parallel with selected ones of the rectifier stages to form a capacitance voltage divider with at least one of the input capacitors, with one of the capacitors in the capacitance voltage divider being variable to vary the A.C. voltage applied to the selected rectifier stages. The input capacitors of the other rectifier stages are connected in parallel with the capacitance voltage divider so that their A.C. input will not be affected by variations of the variable capacitor. In this circuit, variations in the variable capacitor cause variations in the ratio of the capacitance voltage divider, which varies the A.C. input voltage to the selected rectifier stages. This in turn varies the D.C. output of the selected rectifier stages. In one embodiment of this invention, the input capacitor of one of the rectifier stages is made variable and constitutes the variable capacitor of the capacitance voltage divider. In this case, the additional capacitor is a fixed capacitor, although it could also be a variable capacitor if desired.

According to a further suggestion of this invention, the additional capacitor which is connected in parallel with the selected rectifier stages can comprise the inter-electrode capacitance of one of the rectifier circuits. This is advantageous in that the circuit then only requires that one fixed capacitor be replaced by a variable capacitor, which makes the circuit quite economical.

With regard to the efficiency of the capacitance voltage divider, it makes no difference which one of the capacitors is variable. If the variable capacitor has one of its terminals connected to ground, this is of advantage with respect to adjustment of the capacitor. In this case, however, the interelectrode capacitance of a rectifier can not be utilized as one of the capacitors.

Description of the preferred embodiments

Figure 1:
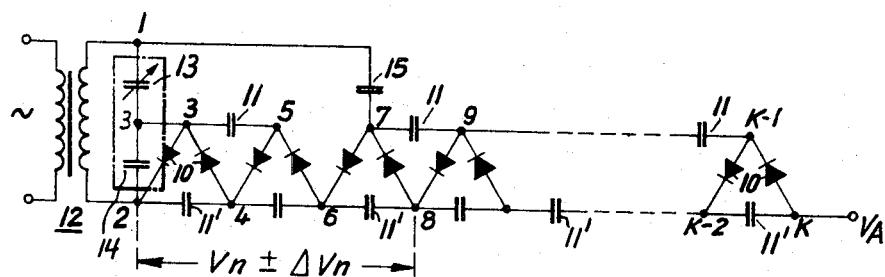
FIGURE 1 is a schematic circuit diagram of one embodiment of the invention.

FIGURE 1 illustrates one voltage multiplying rectifier circuit of this invention. The circuit is composed of semiconductor diodes 10 and fixed input capacitors 11 and is supplied with an A.C. voltage by a transformer 12. The A.C. voltage applied to the individual rectifier stages is rectified by the diodes 10 and applied to output capacitors 11', which are connected together in series to provide a combined D.C. output voltage $V_A$. At points 4, 6, 8 to K–2, fractional voltages of voltage $V_A$ can be tapped off. In the $n$th rectifier stage of a circuit having K stages, the fractional voltage is approximately equal to the value $n/K \cdot V_A$. According to this invention, this fractional voltage is to be made variable in any desired continuous manner by a predetermined amount $\Delta V_n$, without the total voltage $V_A$ being varied, percentagewise, by the same amount. The fractional voltage between the points 2 and 8 is made variable within specific limits by connecting a capacitance voltage divider between points 1 and 2 consisting of a variable capacitor 13 and a fixed capacitor 14. (Capacitor 14 can also be formed by the interelectrode capacitance of the diode 10.) Furthermore, the capacitor 15, which in the prior art circuits would be connected between points 5 and 7, is connected instead between points 1 and 7 directly to the secondary of the transformer 12 in parallel with the capacitance voltage divider. By changing the ratio of the capacitance of capacitor 13 to capacitor 14, the A.C. voltage between points 2 and 3 can be varied between the full value and half the value of the secondary voltage of transformer 12. This voltage is rectified by the diodes 10 and applied to the output capacitors 11 to provide the desired variable fractional voltage $V_n$ between points 2 and 8. As far as the operation of the circuit is concerned, it is of no significance whether the capacitor 13 or the capacitor 14 or both are variable. It is likewise not significant whether the capacitor 14 is a separate capacitor or whether it is formed by the inter-electrode capacitance of one of the diodes 10.

Via the capacitor 15, the other rectifier stages are connected directly to the secondary of the transformer 12 to make up the total voltage $V_A$. It can be seen from the circuit that, upon changing $V_A$, which can be done by varying the voltage of the transformer 12, the partial voltage $(V_n + \Delta V_n)$ also changes by the same percentage.

Figure 2:
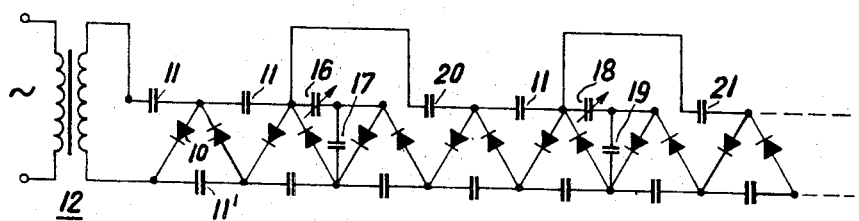
FIGURE 2 is a schematic circuit diagram of another embodiment of the invention.

As can be seen in FIGURE 2, which discloses another embodiment of the invention, corresponding capacitive voltage dividers with capacitors 16 and 17, or 18 and 19, respectively, can also be connected to several rectifier stages. In this case, the other rectifier stages are coupled directly to the transformer 12 via capacitors 20 and 21.

It will be understood that the above description of the present invention is susceptible to various modifications, changes, and adaptations, and the same are intended to be comprehended within the meaning and range of equivalents of the appended claims.

I claim:

1. A voltage multiplying rectifier circuit comprising, in combination:
    (a) a source of A.C. voltage;
    (b) a plurality of rectifier stages each containing an input capacitor, an output capacitor, and a rectifier circuit coupled between said input and output capacitors for rectifying an A.C. voltage applied to said input capacitor and applying the rectified voltage to said output capacitor;
    (c) the output capacitors of said rectifier stages being coupled together in series to form a D.C. output voltage equal to the sum of the D.C. voltages of said output capacitors;
    (d) a capacitance voltage divider including a variable capacitor coupled between said A.C. voltage source and the input of selected ones of said rectifier stages for varying the A.C. voltage applied thereto; and
    (e) the input capacitors of the other rectifier stages being coupled to said A.C. voltage source in parallel with said capacitance voltage divider whereby said variable capacitor varies the A.C. voltage applied to said selected ones of the rectifier stages without varying the A.C. voltages applied to the other rectifier stages.

2. A voltage multiplier circuit as defined in claim 1 wherein one of the capacitors of said capacitance voltage divider comprises the inter-electrode capacitance of a rectifier circuit in one of said selected voltage multiplier stages.

References Cited

UNITED STATES PATENTS 2,213,199    9/1940    Bouwers et al. _____ 321—15
2,619,602   11/1952    Walker et al. _____ 321—15 XR

FOREIGN PATENTS 169,034   10/1951    Austria.

OTHER REFERENCES

Rufer, Richard P., "Multiplier Phototube," Electronics, July 8, 1960, vol. 33, No. 28, p. 51.

JOHN F. COUCH, *Primary Examiner.*

WM. SHOOP, *Assistant Examiner.*